United States Patent [19]

McMurtry et al.

[11] Patent Number: 5,201,621
[45] Date of Patent: Apr. 13, 1993

[54] SHANK FOR A TOOL

[75] Inventors: David R. McMurtry, Wotten-Under-Edge; Peter C. Willis, Bristol, both of United Kingdom

[73] Assignee: Renishaw plc, Glouchestershire, England

[21] Appl. No.: 768,931
[22] PCT Filed: Feb. 4, 1991
[86] PCT No.: PCT/GB91/00156
    § 371 Date: Sep. 26, 1991
    § 102(e) Date: Sep. 26, 1991
[87] PCT Pub. No.: WO91/11282
    PCT Pub. Date: Aug. 8, 1991

[30] Foreign Application Priority Data

Feb. 2, 1990 [GB] United Kingdom ............... 9002364

[51] Int. Cl.$^5$ ............. B23B 31/00; B23C 5/26
[52] U.S. Cl. ................ 409/233; 279/900; 408/239 R
[58] Field of Search ........... 409/233, 231, 232, 234; 408/239 R, 233 A, 240; 279/1 TS, 900, 2.1

[56] References Cited

U.S. PATENT DOCUMENTS

| | | | |
|---|---|---|---|
| 4,135,418 | 1/1979 | Cray et al. | 408/239 R X |
| 4,197,771 | 4/1980 | Heaton et al. | 408/233 X |
| 4,292,866 | 10/1981 | Kaczynski | 279/20 R X |
| 4,714,389 | 12/1987 | Johne | 409/233 |
| 4,726,721 | 2/1988 | Heel et al. | 409/233 |
| 4,747,735 | 5/1988 | Erickson et al. | 409/234 |

FOREIGN PATENT DOCUMENTS

| | | |
|---|---|---|
| 0373086A1 | 6/1990 | European Pat. Off. . |
| 3541236A1 | 5/1987 | Fed. Rep. of Germany . |
| 403514 | 3/1974 | U.S.S.R. ............ 279/1 TS |
| 2163379A | 2/1986 | United Kingdom . |

*Primary Examiner*—Z. R. Bilinsky
*Attorney, Agent, or Firm*—Oliff & Berridge

[57] ABSTRACT

A shank (10) for retaining a tool or touch probe in the socket (S) of a machine tool spindle comprises 6 areas of surface which, in use, bear against the wall of the socket (S). The areas of surface are provided by three balls (34) resiliently supported for movement radial to a shank axis (A) on small flange section (26) (FIG. 2) at one end of the shank (10), and three further balls (36) embedded in the other end of the shank (10). As the shank is drawn into the socket (S) the small flange sections (26) deform allowing the balls (34) to move radially inward until the surface of balls (36) engage the wall of the socket (S). A pull-up stud (38), supported on a frusto-conical block (40) is connected to the shank by a plunger (42) and compression spring (46). Retraction of the shank into the socket by pull-up stud (38) against the resilience of the small flange sections (26), causes the plunger (42) to compress spring (46) until the block (40) bears firmly against the wall of the socket (S). This arrangement prevents excessive loads being put upon the shank to retain it in the socket (S).

6 Claims, 2 Drawing Sheets

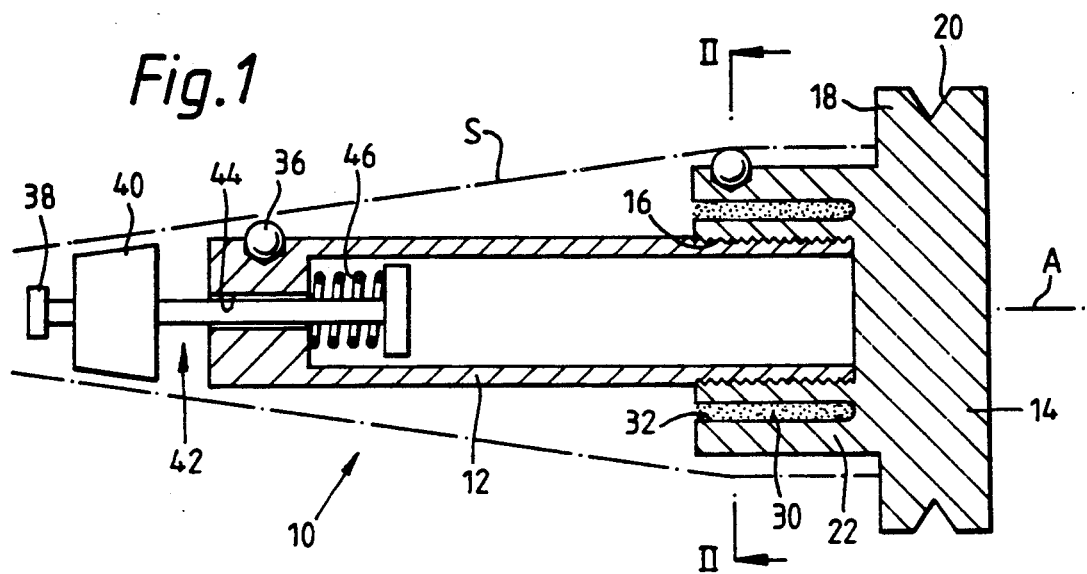
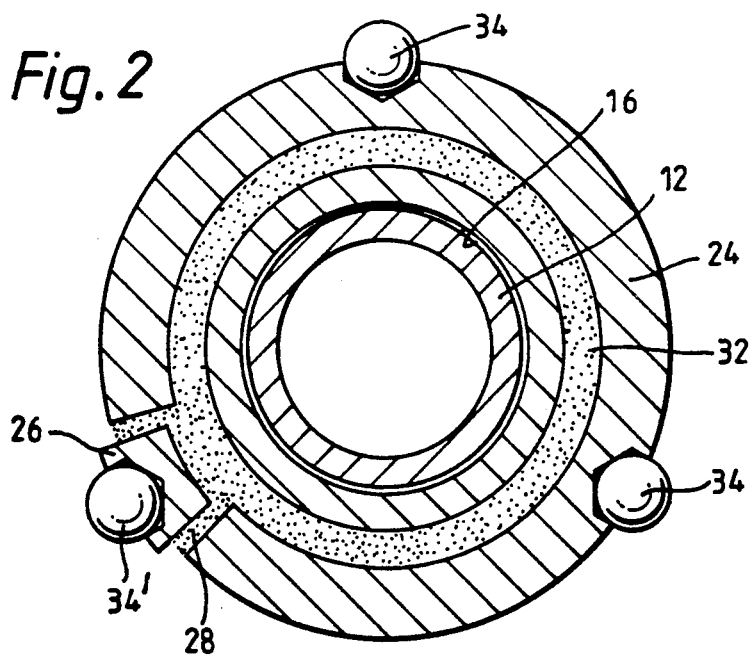

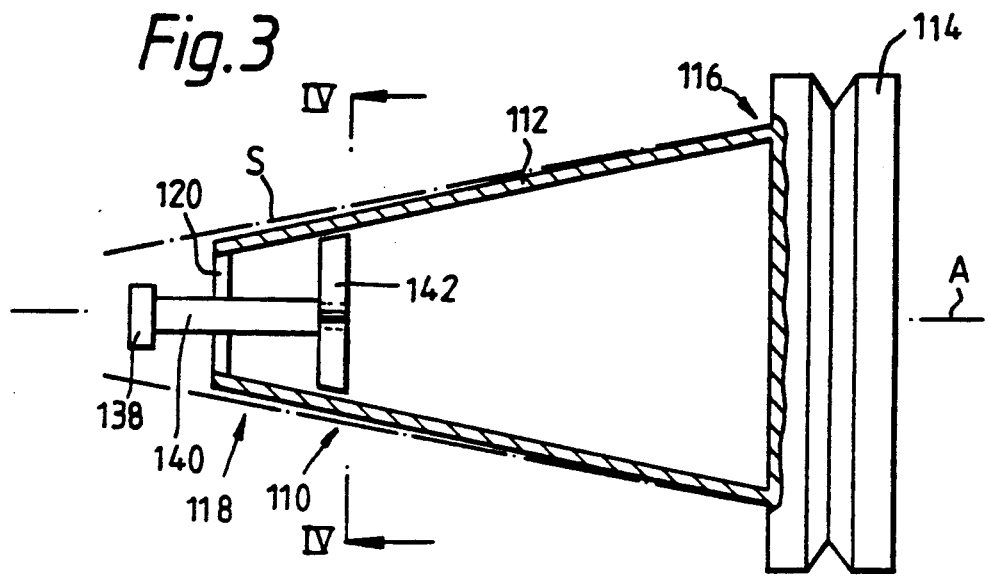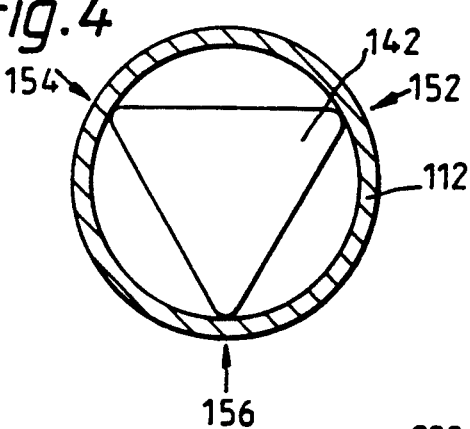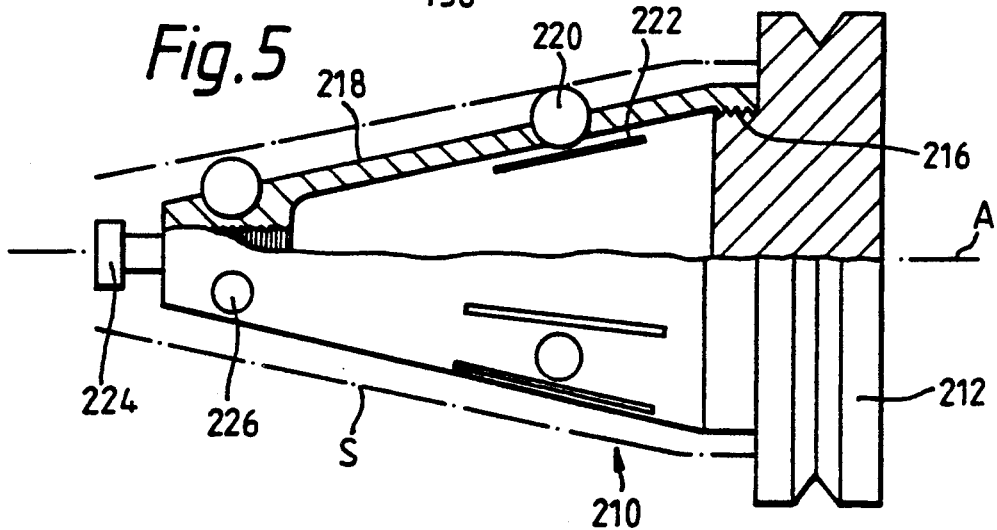

SHANK FOR A TOOL

BACKGROUND OF THE INVENTION

The present invention relates to shanks for retaining tools in the socket of, for example, a spindle of a machine tool.

Typically, a socket in a machine tool spindle has a frusto-conical shape. Known shanks for retaining tools in such spindles have a corresponding frusto-conical shape. The grinding of such a frusto-conical shank is a difficult and expensive process, since the shank must be accurately ground to the correct shape in order to prevent jamming of the shank in the socket. Furthermore, because the shank has a frusto-conical shape, the position of the shank within the socket of the head is not precisely repeatable.

SUMMARY OF THE INVENTION

The present invention provides an elongate shank for retaining a tool or probe in a socket of a machine tool spindle, the socket being defined by a frusto-conical wall, and the shank comprising an axis parallel to the direction of its length; the shank having at one end means providing at least three relatively rigid areas of surface for bearing against the wall, thereby to locate said one end of the shank in the socket, and at the other end means providing at least three further areas of surface for bearing against the wall, thereby to locate said other end of the shank in the socket characterised in that: at least one of said further areas of surface is resiliently moveable relative, and in a direction radial to said axis.

Preferably, three areas of the surface are provided at each end of the shank, thereby providing a kinematic location of the shank in the socket.

In one preferred embodiment three further areas of surface are provided, and only one of said further areas of surface is resiliently movable in said radial direction.

Preferably the shank will be provided with a pull-up stud, by which a gripper inside the socket of the spindle can pull the shank into the spindle. The pull-up stud will preferably be supported on a block shaped to bear against the socket wall and the block is preferable resiliently connected to the shank so that the total pulling force with which the gripper pulls the pull-up stud is not transmitted to the shank.

Such a shank may be used to retain either a tool used to machine a workpiece, or a touch probe which is used to measure the workpiece after machining. A second aspect of the present invention lies in the appreciation that a shank used to retain a touch probe in the socket of a machine tool spindle is, as a consequence of the function of the probe, subject to significantly lower forces and stresses than a shank used to retain a tool in such a spindle, and therefore need not be constructed to withstand forces and stresses such as are normally present in a machining operation.

According to a second aspect of the present invention there is provided a shank for retaining a probe in a machine tool spindle socket, the shank being made of a material selected from the group consisting of: ceramics, plastics or aluminium. Such materials may be cast or extruded into an appropriate shape, typically a frusto-conical shape.

Preferably the ceramic material is of Aluminium Oxide. The plastics material may for example be fibre reinforced plastics material, such as carbon fibre reinforced polyoxymethylene.

Typically a shank of ceramic or plastic material will be provided with a pull-up stud supported on a block shaped to bear against the socket wall, which is resiliently connected to the shank. As stated above this reduces the load on the shank when it is engaged in the socket of the spindle.

BRIEF DESCRIPTION OF THE DRAWINGS

Embodiments of the invention will now be described, by way of example, and with reference to the accompanying drawings in which:

FIG. 1 shows a section through a first embodiment of the present invention;
FIG. 2 shows a section on II—II in FIG. 1;
FIG. 3 shows a partial section through a second embodiment of the present invention;
FIG. 4 is a section on IV—IV of FIG. 3; and
FIG. 5 shows a partial section through a third embodiment of the present invention.

DESCRIPTION OF PREFERRED EMBODIMENTS

Referring now to FIGS. 1 and 2, a shank 10 for retaining a tool (not shown), such as a measuring probe, in a socket S of frusto-conical shape (indicated by the chain dotted line in FIG. 1) is comprised of a baton part 12 and a cup part 14. The baton part 12 and the cup part 14 are held together in a screw threaded engagement 16. The cup part 14 has a cylindrical collar 18 which has a V shaped channel 20 in its circumferential surface. The cylindrical collar 18 and V shaped channel 20 enable the shank to be extracted from a tool magazine by a tool change apparatus. An annular flange 22 provided on the cup part 14 extends around the screw threaded engagement of the baton part 12 and the cup part 14. The annular flange 22 comprises a large section 24 and a small section 26 spaced from the large section 24 by slits 28. An annular channel 30, situated between the annular flange 22 and the screw-threaded engagement is filled with a resilient glue 32, as is the slit 28, to prevent accumulation of e.g. coolant.

The cup part 14 carries three areas of surface which bear against the wall of the socket S. Each of the areas of surface carried by the cup part 14 is provided by a ball 34, 34' embedded in the outer surface of annular flange 22. Two of the three balls 34 are mounted on the large section 24 of the annular flange 22. The third ball 34' is mounted on small section 26 of the flange 22. The comparative elasticity of small section 26 enables resilient movement of the ball 34' in a direction radial to axis A of the shank 10.

Three further areas of surface for bearing against the socket S are provided by a further three balls 36 embedded in the surface of the baton part 12, remote from its engagement with the cup part 14.

The areas of surface provided by the balls 34 and further balls 36 are relatively rigidly supported as compared with the area of surface provided by ball 34'.

A pull-up stud 38, by which the shank 10 may be engaged by a gripper (provided in the socket of a spindle) and pulled into a socket is provided at the baton end of the shank 10. The stud 38 is supported on a frusto-conically shaped block 40. A plunger 42 extends from the block 40, through an aperture 44 into the inside of the baton part 12. The end of the plunger 42 inside the baton part 12 bears against a compression spring 46, which acts to urge the block 40 toward the baton part 12.

It can be seen from FIG. 2 that the area of surface provided by the ball 34' lies slightly proud of the flange 22, when compared with the surfaces of balls 34. Thus, when the shank 10 is pulled into the socket S by pull-up stud 38, the surfaces of the balls 34, 34' supported on the cup part 14 will contact the socket S before the surfaces of the balls 36 supported on the baton part 12. However, as the shank 10 is pulled into the socket S, the resilience of the small section 26 of the cup part 14 will allow it to deform and the ball 34' to be urged radially inward a small amount by the wall of the socket. This allows continued movement of the shank 10 into the socket S until the surfaces of the balls 36 come into contact with the socket S. Thus, the shank will be kinematically supported with respect to the socket S, since it has three locations of engagement with the sockets at one end, and three at the other.

As the shank 10 is drawn into the socket S and the ball 34' supported on the small section 26 of the cup part 14 is urged radially inwards, the resistance to movement of the shank 10 into the socket S increases. When this resistance exceeds a certain threshold, the action of the gripper in the socket S on pull-up stud 38 will cause the plunger 42 to compress spring 46 until the block 40 is firmly abutted against the wall of the socket S. The force with which the shank is now retained in the socket is thus equal to the force with which the spring 46 acts on plunger 42. This arrangement prevents excessive forces being applied to pull the shank 10 into the socket that may cause the shank 10 to jam.

The second embodiment of the present invention is shown in FIG. 3 and comprises a shank 110 having a shell-like, frusto-conical body 112, to which a collar 114 (for extracting the shank 110 from a tool change magazine) is connected at the large-radius end 116 of the body. The connection of the shell-like body 112 to the collar 114 makes the large-radius end 116 relatively rigid to forces acting radially on this part of the body 112 with respect to the shank axis A. The shank 110 is closed at its small radius end 118 by a cap 120 made, for example, of a resilient plastics material. As in the previous embodiment, the shank 110 is pulled into the socket S by a pull-up stud 138. The pull-up stud 138 is connected to a plunger 140 supported on a triangular block 142 retained inside the shell-like body 112 of the shank 110.

It can be seen from FIG. 3 that the solid angle defined by the shell-like body 112 of the shank 110 is fractionally greater than the solid angle defined by the socket S. Thus, when the shank is pulled into the socket S by the pull-up stud 138 at least three (and, depending upon the regularity of the cone, probably more than three) areas of surface at the large-radius end 116 of the shank 110 will engage the socket S initially. As explained above, these areas of surface are relatively rigid and so do not deform radially inwards. However the force exerted by the gripper in the socket S on pull-up stud 138 is transmitted by the block 142 into a radial deforming force on the shell-like body 112. Three areas of surface 150, 152, 154 of the body 112 adjacent the vertices of the triangular block 142 thus deform radially outwards until they come into contact with the wall of the socket S and thereby locate the small radius end 118 of the shank 110 in the socket S. In this embodiment the shank 110 is drawn into and located in the socket S with much greater force than that of the first embodiment, and so the shank may withstand greater loads in terms of the tooling which may be retained by it.

A third embodiment of the present invention is shown in FIG. 4 and comprises a shank 210 having a collar 212 for extracting the shank 210 from a tool change magazine. The collar 212 is provided as a separate part, and has a screw-threaded engagement 216 with a hollow taper 218. The taper 218 supports, adjacent the collar 212, a first set of 3 equispaced balls 220 providing areas of surface for engaging the socket. The balls 220 are supported for resilient movement (in a direction perpendicular to the shank axis A) on the taper 218 by virtue of a pair of slits 222 in the wall of the taper 218, extending longitudinally with respect to axis C. The slits 222 enable deformation of the taper wall when the surfaces of the balls 220 are engaged with the socket by virtue of the shank 210 being pulled into socket S by pull-up stud 224. Deformation of the taper wall enables movement of the shank along axis C while the surfaces of balls 220 are engaged with the socket S. This axial movement of the shank continues until areas of surface provided by 3 balls 226 engage the socket S.

It may be desirable to omit the slits 222 from the design, relying instead upon the intrinsic resilience of the hollow taper 218 to enable axial movement by the shank 210 when the surfaces of balls 220 are engaged with the socket S.

In an alternative, but equivalent embodiment, the balls 226 are resiliently supported, and balls 220 are rigidly supported, e.g. by being positioned more closely adjacent collar 212 (the slits 222 are of course omitted). In such an embodiment the solid angle defined by surfaces of balls 220 and 226 would be smaller than that of the socket S.

We claim:

1. A shank for retaining a tool or probe in a machine tool spindle, the spindle having a frusto-conical socket defined by a wall and a gripper for pulling the shank into the socket, the shank comprising: an elongate body having an axis parallel to the direction of its length; means engagable by the gripper to enable the shank to be pulled into the socket; at one end means providing at least three relatively rigid areas of surface for bearing against the wall, thereby to locate said one end of the shank in the socket, and at the other end means providing at least three further areas of surface for bearing against the wall, thereby to locate said other end of the shank in the socket, at least one of said further areas of surface being resiliently movable relative and in a direction radial to said axis; and means provided on the shank for limiting the load applied to the shank by the gripper to a predetermined maximum value.

2. The shank according to claim 1, wherein said areas of surface and said further areas of surface are respectively provided by three spherical surfaces equispaced about the axis at one end and three further spherical surfaces equispaced about the axis at the other end.

3. The shank according to claim 1, wherein said means engagable by the gripper comprises a pull-up stud enabling engagement of the shank by the gripper, the pull-up stud being supported on a block for bearing against the wall of the socket, wherein the block is connected to the elongate body of the shank by resilient biasing means.

4. The shank according to claim 2 wherein only one of said three further areas of surface is resiliently movable in said radial direction.

5. The shank according to claim 3, wherein said body is made of plastics material.

6. The shank according to claim 5, wherein said plastics material is carbon fiber reinforced plastics material.

* * * * *